United States Patent [19]

Kammeraad

[11] 3,979,811

[45] Sept. 14, 1976

[54] OVERHEAD CAMSHAFT AND VALVE TRAIN INSERTION AND REMOVAL TOOLS

[75] Inventor: James A. Kammeraad, Holland, Mich.

[73] Assignee: K-Line Industries, Inc., Holland, Mich.

[22] Filed: Oct. 11, 1974

[21] Appl. No.: 514,097

[52] U.S. Cl. .................................... 29/215; 29/217; 29/227; 29/249; 29/282; 29/156.7 R

[51] Int. Cl.[2] .......................................... B23P 19/04

[58] Field of Search .............. 29/213 R, 213 E, 215, 29/216, 217, 225, 227, 249, 282, 156.7 R

[56] References Cited

UNITED STATES PATENTS

| | | | |
|---|---|---|---|
| 1,498,531 | 6/1924 | Allen | 29/215 |
| 1,849,538 | 3/1932 | Bernitz, Jr. | 29/216 |
| 2,056,329 | 10/1936 | Prosser | 29/215 |
| 2,434,456 | 1/1948 | Cook | 29/215 |
| 2,510,334 | 6/1950 | Delehanty | 29/217 |
| 3,091,839 | 6/1963 | Binkley | 29/217 |
| 3,676,913 | 2/1971 | Fagen | 29/217 |
| 3,793,999 | 2/1974 | Seiler et al. | 29/213 |

FOREIGN PATENTS OR APPLICATIONS

| | | | |
|---|---|---|---|
| 430,118 | 6/1935 | United Kingdom | 29/215 |
| 528,224 | 10/1940 | United Kingdom | 29/215 |
| 1,029,257 | 6/1953 | France | 29/215 |
| 976,160 | 11/1964 | United Kingdom | 29/249 |

*Primary Examiner*—C.W. Lanham
*Assistant Examiner*—Dan C. Crane
*Attorney, Agent, or Firm*—Price, Heneveld, Huizenga & Cooper

[57] ABSTRACT

Tools and method for removing an overhead camshaft and assembling and disassembling the valve train of an internal combustion engine. One of the tools comprises a plurality of pivotal rocker members for depressing the valves of the engine allowing the overhead camshaft to be removed axially from the cylinder head. This tool includes an improved base for attachment to the cylinder head as well as improved supports for the rocker members. The companion tool includes a hollow cylinder facilitating removal of the spring keepers when the spring and retainer are depressed and having an internal annular, inclined shoulder facilitating insertion of the keepers during assembly of the valve train.

15 Claims, 6 Drawing Figures

OVERHEAD CAMSHAFT AND VALVE TRAIN INSERTION AND REMOVAL TOOLS

This invention relates to tools and methods for repairing internal combustion engines, and, more particularly, to tools and a method for removing an overhead cam shaft and assembling and disassembling the valve train of an internal combustion engine having an overhead cam shaft.

BACKGROUND OF THE INVENTION

Internal combustion engines with overhead cam shafts have become increasingly commonplace with the advent of smaller, more economical engines. Such engines normally include an elongated cam shaft rotatably journaled in each head. The shaft has a plurality of irregularly shaped cam lobes which engage and depress valve assemblies aligned therewith directly beneath the respective lobes. Should it be necessary to remove the cam shaft to repair it, the valve assemblies, or the cylinder head itself, it is necessary to simultaneously depress all of the valve assemblies in order to remove the cam shaft axially through its bearing areas.

Attempts have been made to facilitate such cam shaft removal by utilizing tools having pivotal rocker assemblies for depressing one or more of the valve assemblies. Problems have occurred with the prior known tools including the breakage of the attachment means for the tool to the cylinder head during normal useage as well as deformation of the pivotal support for the rocker members. Such breakage and deformation prevents efficient use of the tool and requires extensive repair or replacement of the tool.

After removal of the overhead cam shaft and the tappets or cam followers covering the valve assemblies beneath the cam shaft, disassembly of the remainder of the valve assembly requires compressing the valve spring and valve spring retainer. Such compression enables removal of the keepers for the retainer allowing removal of the various parts. In the past, separate tools apart from those which are required to remove the cam shaft were necessary to remove the keepers. Such removal was often difficult, tedious, and time consuming. The present invention has solved these problems by providing a method and separate tool used in conjunction with the improved cam shaft removal tool allowing simple and convenient removal and insertion of the keepers and disassembly and assembly of the valve trains.

SUMMARY OF THE INVENTION

Accordingly, it is an object and purpose of the present invention to provide tools for removing an overhead cam shaft and disassembling and assembling the valve train of an internal combustion engine. The invention also provides a simplified, more efficient method for disassembling and assembling the valve assemblies following removal of the cam shaft.

In one aspect, the invention provides an improved tool for depressing valve assemblies of internal combustion engines having an overhead cam shaft, the tool being of the type including an elongated base for attachment to the cylinder head, means for attaching the base to the cylinder head, a support rod, means for mounting the support rod generally parallel to and spaced from the base, and a plurality of rocker assemblies pivotally mounted on the support rod for depressing the valve assemblies.

Each of the rocker assemblies includes a pivotable rocker shoe and threaded means for pivoting said rocker shoe about the pivot axis formed by the support rod. The improvement in the tool comprises a rigid bar forming the base of the tool including a plurality of rigid attachment bracket means removably secured to the bar for securing said bar to the cylinder head. The improvement further includes a plurality of generally removable, replaceable U-shaped rocker shoe support bracket means aligned along said bar for supporting said rocker shoes. Each of the said rocker shoes support bracket means including an upstanding support flange immediately adjacent either side of one of the rocker shoes and aligned apertures for receiving said support rod therethrough. The improved tool is durable and breakage-resistant and prevents deformation of the support rod about which the rocker shoes pivot.

In another aspect, the invention provides a valve spring compressing and keeper removal and installation tool comprising a hollow cylinder having means for engaging and depressing the spring retainer of the valve assembly of an internal combustion engine. Means are also included for releasing the spring retainer keepers during disassembly and for guiding and inserting the keepers into correct position during assembly of the valve train.

In other aspects, the invention includes the combination of the two tools mentioned above as well as the method for removing and inserting the keepers for disassembling and assembling the valve assemblies.

These and other objects, advantages, purposes, and features of the invention will become more apparent from a study of the following description taken in conjunction with the drawings.

DESCRIPTION OF THE PREFERRED EMBODIMENT

Figure 1:
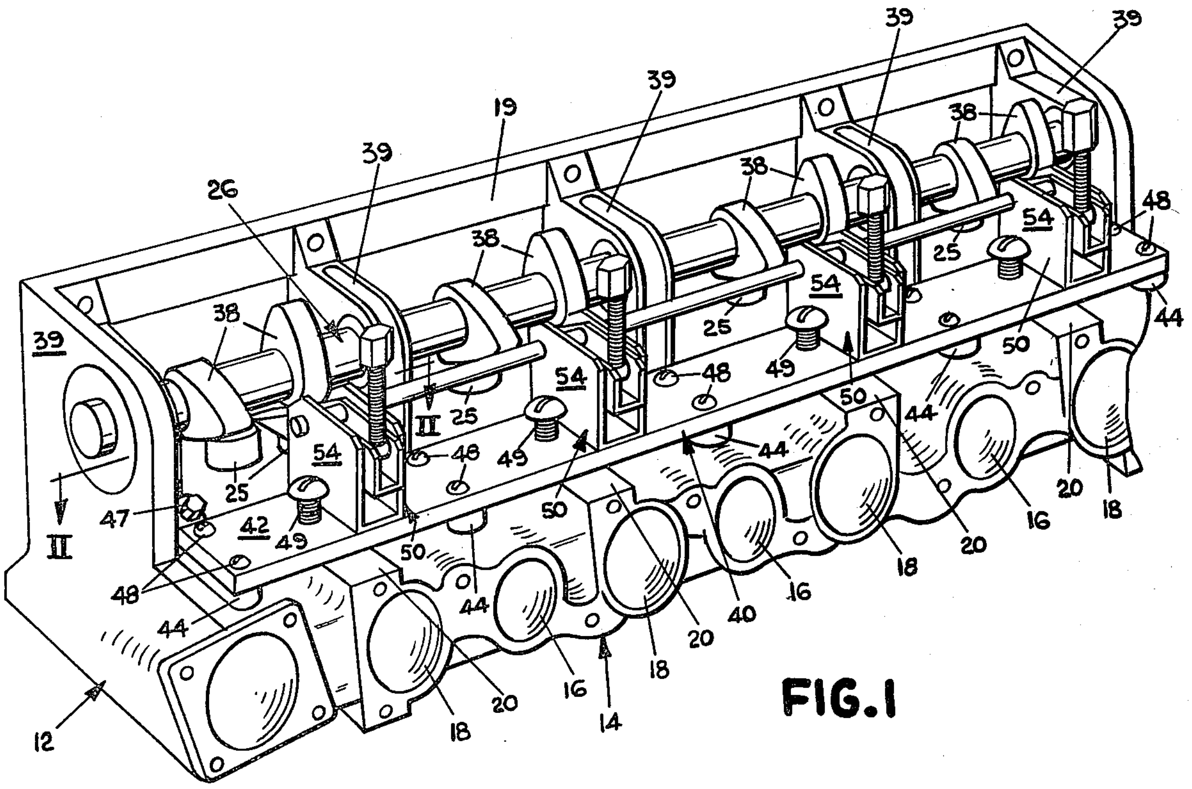
FIG. 1 is a perspective view of a typical cylinder head including an overhead cam shaft with the improved cam shaft removal tool of the present invention mounted thereon.

Referring now to the drawings in greater detail, FIG. 1 illustrates the improved cam shaft removal tool 40 of the present invention mounted on a typical cylinder head 12 of the type including an overhead cam shaft. The cylinder head illustrated is that from a Chevrolet Vega including four cylinders and a single overhead cam shaft. However, the tool 40 as well as the valve spring compressing and valve keeper tool 80 and method described herein may be used with many overhead cam shaft internal combustion engines simply by changing the attaching means to accommodate the configuration of the desired cylinder head.

Figure 2:
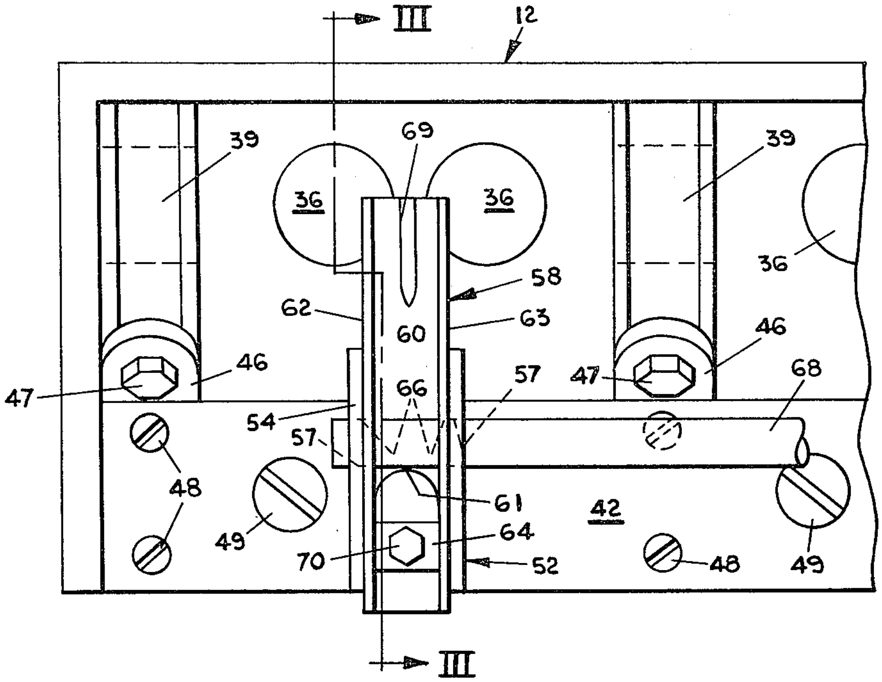
FIG. 2 is a fragmentary, plan view of the cylinder head and improved tool taken along plane II—II of FIG. 1.

As shown in FIG. 1, the cylinder head 12 includes an intake-exhaust portion 14, including intake ports 16 alternating with exhaust ports 18, and a cam shaft supporting portion 19. The exhaust ports 18 include upstanding flanges 20 to which the exhaust manifold is bolted. As shown in FIG. 2, each of the intake and exhaust ports 16, 18 leads to a seated port 22 to the top of the cylinder. Port 22 is aligned with valve guide 24, both of which are vertically aligned with the axis A of a cam shaft 26 rotatably mounted in a cam shaft portion 19 of the cylinder head. Mounted in and about valve guide 24 is a valve assembly 25 including a valve 27, closing port 22, and having a stem 28 extending beyond the upper end of the valve guide. A coil valve spring 30 is mounted in a recess or spring seat 31 surrounding the end of the valve guide. The valve 27 is biased upwardly by spring 30 by means of a dish-like valve retainer 32 which is held in place adjacent a necked-down or keeper-holding portion 29 of the valve stem 28 by keepers 34. A tappet or cam follower 36 is telescoped over the end of the valve and rests on the end of the valve stem 28 directly beneath one of the plurality of lobes 38 on cam shaft 26. A plurality of outwardly extending support walls 39 in portion 19 of the head support the cam shaft 26 above and in alignment with the valve assemblies and tappets 36. Walls 39 include axially aligned apertures therethrough receiving suitable bearings for rotational support of the cam shaft.

Figure 3:
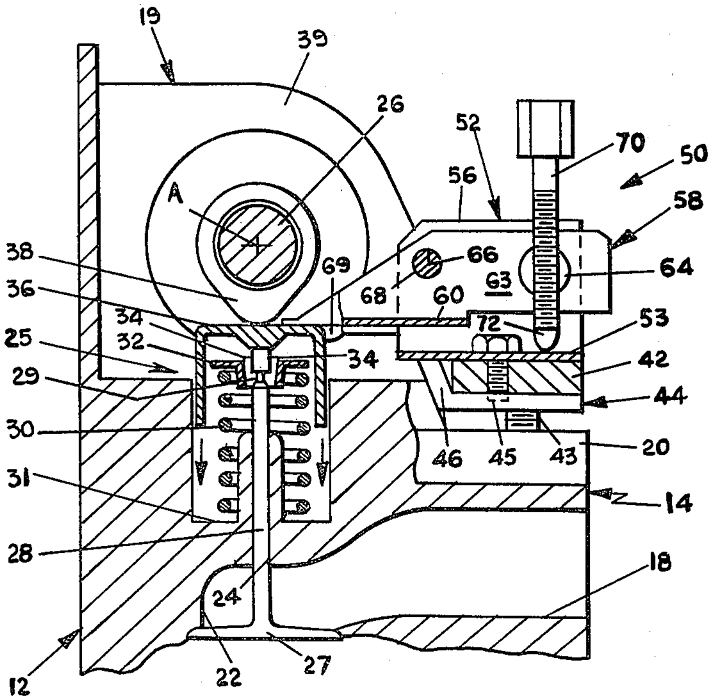
FIG. 3 is a fragmentary, sectional view of the cylinder head with the improved tool taken along line III—III of FIG. 2.

Referring to FIGS. 1–3, the improved valve asembly depressing and cam shaft removal tool 40 generally includes a rigid bar 42 forming a base and a plurality of rocker assemblies 50 mounted thereon for depressing pairs of valve assemblies 25 beneath the cam shaft. Bar 42 is preferably rigid, solid, and formed from steel. Removably secured at spaced points to the underside of bar 42 are a plurality of attaching brackets 44. Each bracket 44 includes an attaching flange 45 which is secured to the underside of bar 42 by suitable screws 48 and an integral, outwardly projecting securing flange 46. Flange 46 extends at an angle from one end of flange 45 and is designed to fit over a valve cover securing aperture at the base of one of the support walls 39. A securing bolt 47 is inserted through an aperture in flange 46 to rigidly secure the tool 40 to the cylinder head 12. The rigidity and strength of bar 42 and brackets 44 resist breakage encountered with the attaching means of other known tools of this type. Thus, the present improved tool is more durable and maintenance free. If one of the brackets 44 should break, it can easily be removed and replaced.

In order to properly position the base or bar 42 with respect to the intake-exhaust portion of the cylinder head, a plurality of positioning screws 49 threadedly secured through bar 42 in alignment with flanges 20 of the exhaust ports are provided. Screws 49 may be rotated to correctly position and support the tool with respect to the valve assemblies 25 and valve tappets 36 after initial attachment.

Positioned atop the bar 42 and located so as to be centered between the pair of valve tappets 36 of valve assemblies 25 for each cylinder are the rocker assemblies 50. Each rocker assembly includes a generally U-shaped rocker shoe support bracket 52 including a base 53 and upstanding left and right support flanges 54 and 56. The brackets 52 are securely attached to the top of the bar 42 by suitable securing bolts passing through the base 53. Flanges 54, 56 include aligned support rod apertures 57 extending therethrough and offset toward the upper corner of the flanges which is closest to the head 12 when tool 40 is attached thereto.

Pivotally supported between the flanges 54, 56 is a generally U-shaped rocker shoe 58 having a base flange 60 and upstanding flanges 62, 63 extending therefrom. A rod 64 having a threaded aperture extending centrally therethrough transverse to the rod axis is pivotally mounted between flanges 62, 63 in suitable apertures located in those flanges toward the rear of the shoe 58. Suitable aligned apertures 66 are provided near the forward, upper edge of flanges 62, 63 for receiving the pivot support rod 68 therethrough. The single elongated pivot support rod 68 is passed through the plurality of rocker assemblies 50 including apertures 57 and 66 in the support flanges and rocker shoes to pivotally support the rocker shoes in each of the assemblies. Support of the rod 68 immediately outside flanges 62, 63 of shoe 58 by flanges 54, 56 prevents bending and distortion of the rod otherwise resulting from the concentrated stresses on the pivot rod due to compression of springs 30. Previously known tools of this type have been highly susceptible to such bending.

For pivotal movement of the rocker shoes, a bolt 70 is threaded in the aperture in pivot rod 64 and includes a rounded bearing surface 72 engaging a detent therebeneath in the base 53 of the support bracket 52. Base flange 60 of rocker shoe 58, including a strengthening rib 69 formed centrally and downwardly in the end thereof, extends forwardly out of the support bracket 52 for engagement with a pair of valve tappets 36. The rear portion of the flange is cut away as at 61 to provide space for bolt 70. Accordingly, rotation of bolt 70 rotates rocker shoe 58 which is pivotally supported on pivot support rod 68 above the base 53 of bracket 52. Counterclockwise rotation of the shoes 58 (FIG. 3) depresses tappets 36 and the valve assemblies allowing cam shaft 26 to be slid axially out of the apertures in support walls 39. Clockwise rotation permits the springs to raise the valve assemblies after the cam shaft has been removed. The pivoting of rod 64 as the bolt 70 is rotated compensates for the pivotal movement of the rocker shoe and allows the bolt to remain generally vertical for easy rotation with a wrench regardless of the rotational position of the rocker shoe.

Figure 5:
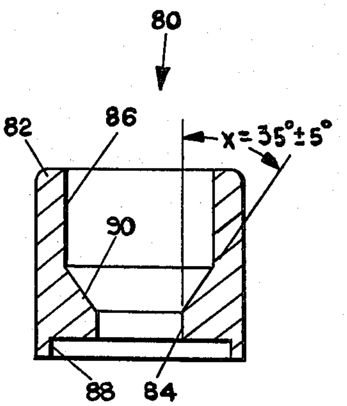
FIG. 5 is a sectional view of the removal tool and taken along plane V—V of FIG. 4.
Figure 6:
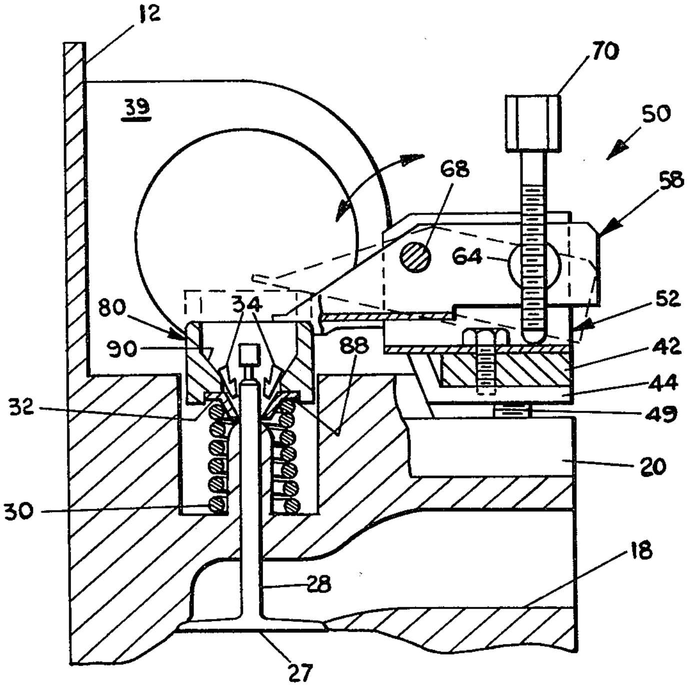
FIG. 6 is a sectional view of the cylinder head and tools of the present invention illustrating the combination of tools and method for removing the valve spring retainer and keepers therefor allowing removal of the valve assembly.
Figure 4:
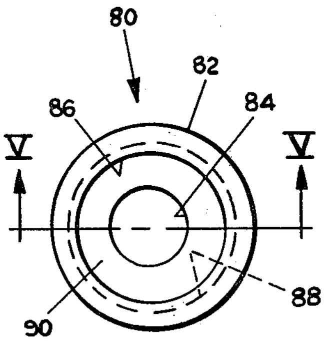
FIG. 4 is a plan view of the valve spring compressing and keeper removal tool of the present invention.

Referring now to FIGS. 4 and 5, the valve spring compressing and keeper removal and installation tool 80 used in conjunction with the cam shaft removal and valve spring compressing tool 40 is illustrated. Tool 80 includes a hollow, cylindrical body 82 within which are formed passageways 84, 86 and recess 88. Circular passageway 84 is coaxial with the cylinder axis and intermediate the ends of the cylinder while circular, coaxial passageway 86 communicates with passageway 84 and extends inwardly from the top end of cylinder 82. Recess 88 is shallow and also circular. The recess communicates with passageway 84 and extends inwardly from the bottom end of the cylinder. Passageway 86 has a diameter and cross-sectional area greater than that of passageway 84 to allow retrieval of the keepers 34 upon disassembly of the valve assembly 25 as is described below. Recess 88 has a diameter and cross-sectional area matched to that of the spring retainer 32 and larger than both the diameter and cross-sectional areas of passageways 84 and 86. An inclined, annular shoulder 90 joins or connects passageways 84 and 86 and provides a surface for receiving, guiding, and inserting keepers 34 when spring 30 and spring retainer 32 are depressed and the keepers are placed in tool 80 for reassembly. A conventional lock replacer tool can be used to facilitate such insertion. It has been found that for best results in inserting and withdrawing the keepers, that angle X (FIG. 5) comprising the angle of shoulder 90 with the axis of the cylinder, should be approximately 35° plus or minus 5°. Formation of the shoulder at this angle allows the keepers to slide down and be guided into the cone-shaped portion of retainer 32 (FIG. 6). Thereafter, when tool 80 and retainer 32 are raised with tool 40, the keepers are guided into holding portion 29 of stem 28 to retain the assembly 25 together. As the retainer and tool 80 move upwardly, the retainer guides the keepers into locking position. The shoulder 90 and bore 86 also provide room for the keepers to fall away and be released from the stem 28 upon depression of the spring during disassembly. The keepers can then be grasped and retrieved through bore 86.

DESCRIPTION OF THE METHOD

As will now be understood, the valve assembly depressing the cam shaft removal tool 40 is first used to remove the cam shaft 26 from the cylinder head 12. Tool 40 is secured to the valve cover securing apertures of the cylinder head via attachment brackets 44 and suitable bolts 47. The level or position of tool 40 is adjusted with screws 49 engaging exhaust port flanges 20. Each of the base flanges 60 of the rocker shoes 58 are arranged in contract with a pair of valve tappets 36 beneath the cam shaft 26. Bolts 70 are then rotated, forcibly pivoting rocker shoes 58 about pivot support rod 68 in a counterclockwise direction and depressing each valve assembly via its tappet 36. Normally, the tappets are depressed to a level flush with the top of recess 31. Thereafter, cam shaft 26 nd its associated bearings may be axially removed from support walls 39 without interference from the valve assemblies. Installation of the cam shaft may be accomplished by reinserting the cam shaft in its bearings in support walls 39 and rotating bolts 70 in the opposite direction to release the depressed valve assemblies.

Once the cam shaft 26 has been removed, tool 40 is used in combination with cylindrical valve spring compressing tool 80 to disassemble the valve assemblies. Shown best in FIG. 6, tool 40 is positioned in a manner similar to that for removing the cam shaft 26. After tappets 36 have been lifted off the valve assemblies, cylindrical tools 80 are placed over the valve spring retainers 32 between the ends of base flanges 60 and the spring retainers. Each base flange 60 from each rocker shoe 58 contacts the upper edges of two of the cylindrical tools 80 for simultaneous disassembly of an adjacent pair of valves. Thereafter, bolt 70 is rotated, pivoting shoe 58 counterclockwise from the position shown in phantom in FIG. 6 to that shown in solid. Such movement forces base flange 60 downwardly to compress spring 30 and move spring retainer 32 away from keepers 34. When the spring has been compressed sufficiently, keepers 34 are released to freely drop and rest against passageway 84 and inclined shoulder 90. The keepers are then removed through passageway 86. Thereafter, the bolt 70 is rotated in the opposite direction thereby raising the tool 80 and spring retainer 32 and releasing the compression of spring 30. When the spring has been completely released, the tool 80 may be withdrawn from the assembly, the retainer and spring removed, and the valve 27 removed downwardly through valve guide 24.

The foregoing procedure requires pressurization of the cylinder to hold the valve in closed position if the head is on the engine block. The valves may be moved to closed position by hand if the head has been removed from the block.

For reinsertion of the keepers, the tool 40 is attached as described above for disassembly. The valve, spring, and retainer are assembled and the tool 80 placed over the retainer. Tool 80 is held between the end of base flange 60 and the retainer while the spring and retainer are depressed by rotating bolt 70 opposite to the direction for disassembly. Thereafter, a suitable tool may be used for holding and placing the keepers in passageway 86. Cylindrical passageway 86 is formed with a sufficiently large diameter to allow insertion and use of such a tool. Alternatively, the keepers may be placed therein by hand. With either method, the keepers are guided into the cone-shaped portion of the retainer (FIG. 6) and against the valve stem by inclined shoulder 90. Bolt 70 is then rotated to raise the retainer and cylindrical tool. The raising of the retainer pushes the keepers against the holding portion 29 of the stem 28 to lock the retainer thereon. The tappet and overhead cam shaft may then be assembled in the reverse of the manner described above.

Accordingly, the present invention provides an improved valve assembly depressing and cam shaft removal tool which is strong, rigid, very durable and breakage resistant and resists deformation of the pivot support bar 68 when the valve assemblies are depressed with rocker shoes 58. Use of the tool 40 in combination with the cylindrical valve spring compressing and valve keeper removal and installation tool 80 including the inclined, annular shoulder 90 provides a simplified, efficient method for disassembling and assembling the valve assemblies after removal of the overhead cam shaft.

While one form of the invention has been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. In an overhead cam shaft removal tool for an internal combustion engine, the tool being of the type including an elongated base for attachment to the cylinder head of the engine, means for attaching said base to the cylinder head, a support rod, means for mounting the support rod generally parallel to and spaced from said base, a plurality of rocker assemblies pivotally mounted on said support rod for depressing the valve assemblies, each of said assemblies including a pivotable rocker shoe and threaded means for pivoting said rocker shoe about a pivot axis, the improvement comprising: a rigid bar forming the base of said tool; a plurality of rigid attachment bracket means for securing said bar to the cylinder head, each of said bracket means being removably secured to the underside of said bar; a plurality of generally U-shaped rocker shoe support bracket means for supporting said rocker shoes, said rocker show bracket means being aligned along said bar, each of said rocker shoe support bracket means supporting one of said rocker shoes and including a base and a pair of upstanding support flanges extending upwardly from said base and integrally connected by said base, said support flanges being immediately adjacent either side of said rocker shoe and including aligned apertures for receiving said support rod therethrough; and securing means extending between said base of each of said U-shaped rocker shoe support bracket means and said bar for securing each of them atop said bar.

2. The improved tool of claim 1 wherein each of said attachment bracket means includes first and second flanges, said first flange extending beneath and secured to the underside of said bar, said second flange extending upwardly from said first flanges and having an aperture for receiving therethrough securing means for securing said tool to said cylinder head.

3. The improved tool of claim 1 wherein each of said rocker shoes includes an elongated, U-shaped member pivotally mounted between said upstanding support flanges of one of said rocker shoe support bracket means.

4. The improved tool of claim 3 wherein said U-shaped rocker shoe member includes a base flange extending outwardly of said support bracket means for engaging and depressing a pair of valve assemblies on the cylinder head and side members extending upwardly from said base flange including aligned apertures, said support rod extending through said apertures in said support bracket flanges and side members of said rocker shoe to pivotally support said rocker shoe.

5. The improved tool of claim 3 in combination with a valve spring compressing and keeper removal and installation tool comprising a hollow cylinder having means for engaging and depressing the spring retainer of one of the valve assemblies of said engine and means for releasing and inserting the spring retainer keepers for the spring retainer to disassemble and assemble the valve assembly.

6. In an overhead cam shaft removal tool for an internal combustion engine, the tool being of the type including an elongated base for attachment to the cylinder head of the engine, means for attaching said base to the cylinder head, a support rod, means for mounting the support rod generally parallel to and spaced from said base, a plurality of rocker assemblies pivotally mounted on said support rod for depressing the valve assemblies, each of said assemblies including a pivotable rocker shoe and threaded means for pivoting said rocker shoe about a pivot axis, the improvement comprising:

a rigid bar forming the base of said tool; a plurality of rigid attachment bracket means for securing said bar to the cylinder head, each of said bracket means being removably secured to said bar; a plurality of generally U-shaped rocker shoe support bracket means for supporting said rocker shoes; means for securing said rocker shoe bracket means along said bar in alignment with one another, each of said rocker shoe support bracket means supporting one of said rocker shoes and including an upstanding support flange immediately adjacent either side of said rocker shoe and aligned apertures for receiving said support rod therethrough;

said U-shaped rocker shoe members each including a base flange extending outwardly of said support bracket means for engaging and depressing a pair of valve assemblies on the cylinder head and side members extending upwardly from said base flange including aligned apertures, said support rod extending through said apertures in said support bracket flanges and side members of said rocker shoe to pivotally support said rocker shoe;

a valve spring compressing and keeper removal and installation tool comprising a hollow cylinder having means for engaging and depressing the spring retainer of one of the valve assemblies of said engine and means for releasing and inserting the spring retainer keepers for the spring retainer to disassemble and assemble the valve assembly;

said releasing and inserting means including a first axial passageway in said cylinder having a first cross-sectional area greater than the cross-sectional area of the spring retainer keepers on the stem of the valve in the valve assembly and located intermediate the ends of said cylinder, a second passageway coaxial with and extending from one end of said cylinder toward said first passageway, said second passageway having a cross-sectional area greater than said first passage-way allowing retrieval of the keepers when released, and an inclined shoulder connecting said first and second passageways for receiving, guiding, and inserting said keepers when the spring retainer and valve spring in said assembly are depressed with said tool.

7. The tool combination of claim 6 wherein said engaging and depressing means include an annular recess extending from the other end of said cylinder toward said first axial passageway, said recess having a cross-sectional area greater than said first passageway and communicating therewith.

8. The tool combination of claim 7 wherein said shoulder is annular and is inclined to the axis of said cylinder at an angle of about 35°.

9. In an overhead cam shaft removal tool for an internal combustion engine, the tool being of the type including an elongated base for attachment to the cylinder head of the engine, means for attaching said base to the cylinder head, a support rod, means for mounting the support rod generally parallel to and spaced from said base, a plurality of rocker assemblies pivotally mounted on said support rod for depressing the valve assemblies, each of said assemblies including a pivotable rocker shoe and threaded means for pivoting said rocker shoe about a pivot axis, the improvement comprising:

a rigid bar forming the base of said tool; a plurality of rigid attachment bracket means for securing said bar to the cylinder head, each of said bracket means being removably secured to said bar; a plurality of generally U-shaped rocker shoe support bracket means for supporting said rocker shoes; means for securing said rocker shoe bracket means along said bar in alignment with one another, each of said rocker shoe support bracket means supporting one of said rocker shoes and including an upstanding support flange immediately adjacent either side of said rocker shoe and aligned apertures for receiving said support rod therethrough;

said overhead cam shaft removal tool being in combination with a valve spring compressing and keeper removal and installation tool comprising a hollow cylinder having means for engaging and depressing the spring retainer of one of the valve assemblies of said engine; said rocker shoes each including means for engaging said hollow cylinder for depression thereof; said hollow cylinder including an internal, annular shoulder inclined toward a valve stem of the engine when in use for engaging valve spring retainer keepers during their installation and removal from a valve stem for holding a spring retainer and, thus, facilitating the release and insertion of such spring retainer keepers for the spring retainer during disassembly and assembly of the valve assembly.

10. A valve spring compressing and valve spring keeper removal and installation tool comprising a hollow cylinder having first and second ends, said second end having means for engaging and depressing the spring retainer of a valve assembly of an internal combustion engine; and means for releasing and inserting the spring retainer keepers for the spring retainer to disassemble and assemble the valve assembly; said releasing and inserting means including an axial passageway extending through said cylinder from said first end to said second end; said passageway including an inclined shoulder extending around at least a portion of the interior of at least a portion of said passageway for guiding insertion and removal of the valve spring retainer keepers into and from the valve spring retainer, said shoulder being inclined inwardly and toward said second cylinder end whereby valve spring retainer keepers may be inserted in said passageway at said first cylinder end and will be guided downwardly and inwardly into position to lock the valve spring retainer around a valve stem which receives said retainer when said second cylinder end engages and depresses the retainer.

11. The tool of claim 10 wherein said passageway includes a first axial portion having a first cross-sectional area greater than the cross-sectional area of the spring retainer keepers on the stem of the valve in the valve assembly and located intermediate the ends of said cylinder, a second portion coaxial with and extending from said one end of said cylinder toward said first passageway portion, said second passageway portion having a cross-sectional area greater than said first passageway portion allowing insertion of the keepers during assembly and retrieval of the keepers when released, and said inclined shoulder connecting said first and second passageways for receiving, guiding, and inserting said keepers when the spring retainer and valve spring in said assembly are depressed and thereafter relaxed with said tool.

12. The tool of claim 10 wherein said engaging and depressing means include an annular recess extending from said second end of said cylinder toward said first axial passageway portion for locating said tool on a valve spring retainer, said recess having a cross-sectional area greater than said first passageway portion and communicating therewith.

13. The tool of claim 12 wherein said first and second passageway portions and recess are circular, said inclined shoulder being annular and concentric with said passageway portions and recess which are concentric with one another.

14. The tool of claim 10 wherein said shoulder is annular and is inclined to the axis of said cylinder at an angle of about 35°.

15. The tool of claim 10 wherein said inclined shoulder is annular and inclined to facilitate the guiding of keepers into position in the cone-shaped keeper receiving portion of a valve spring retainer.

* * * * *